(12) United States Patent
Lejin P J

(10) Patent No.: US 12,255,872 B2
(45) Date of Patent: Mar. 18, 2025

(54) PROTECTIVELY DISPLAYING SPECIFIC FIELDS IN SPECIFIC VIEWS OF A SECURE INTERFACE

(71) Applicant: Salesforce, Inc., San Francisco, CA (US)

(72) Inventor: Jose Lejin P J, Bengaluru (IN)

(73) Assignee: Salesforce, Inc., San Francisco, CA (US)

( * ) Notice: Subject to any disclaimer, the term of this patent is extended or adjusted under 35 U.S.C. 154(b) by 187 days.

(21) Appl. No.: 17/990,896

(22) Filed: Nov. 21, 2022

(65) Prior Publication Data

US 2024/0171543 A1    May 23, 2024

(51) Int. Cl.
*H04L 9/06* (2006.01)
*H04L 9/40* (2022.01)

(52) U.S. Cl.
CPC ........ *H04L 63/0263* (2013.01); *H04L 9/0618* (2013.01); *H04L 63/0853* (2013.01)

(58) Field of Classification Search
CPC ............ H04L 63/0263; H04L 63/0853; H04L 9/0618
See application file for complete search history.

(56) References Cited

U.S. PATENT DOCUMENTS 8,904,279 B1 * 12/2014 Bougon ................. G06F 21/44
                                                         715/236
10,521,496 B1 * 12/2019 Goodwin ............. G06F 40/205

* cited by examiner

*Primary Examiner* — Shirley X Zhang
(74) *Attorney, Agent, or Firm* — Butzel Long

(57) ABSTRACT

A computer-implemented method is disclosed. The method includes receiving a request from a client device for a field value information in a view of a web client application that includes a web browser application. The method further includes generating a real value of the field value information that includes field value characters arranged in an original order, generating elements of the web browser application that includes several random characters and the field value characters, and assigning and positioning unique identity numbers within the elements. The method also includes arranging the elements in a random order different than the original order of the field value characters to form a protected text string, providing the protected text string and a protected rendering rule for rendering to the web browser application. The protected rendering rule causes the web client application to display the field value information for the intended user.

19 Claims, 10 Drawing Sheets

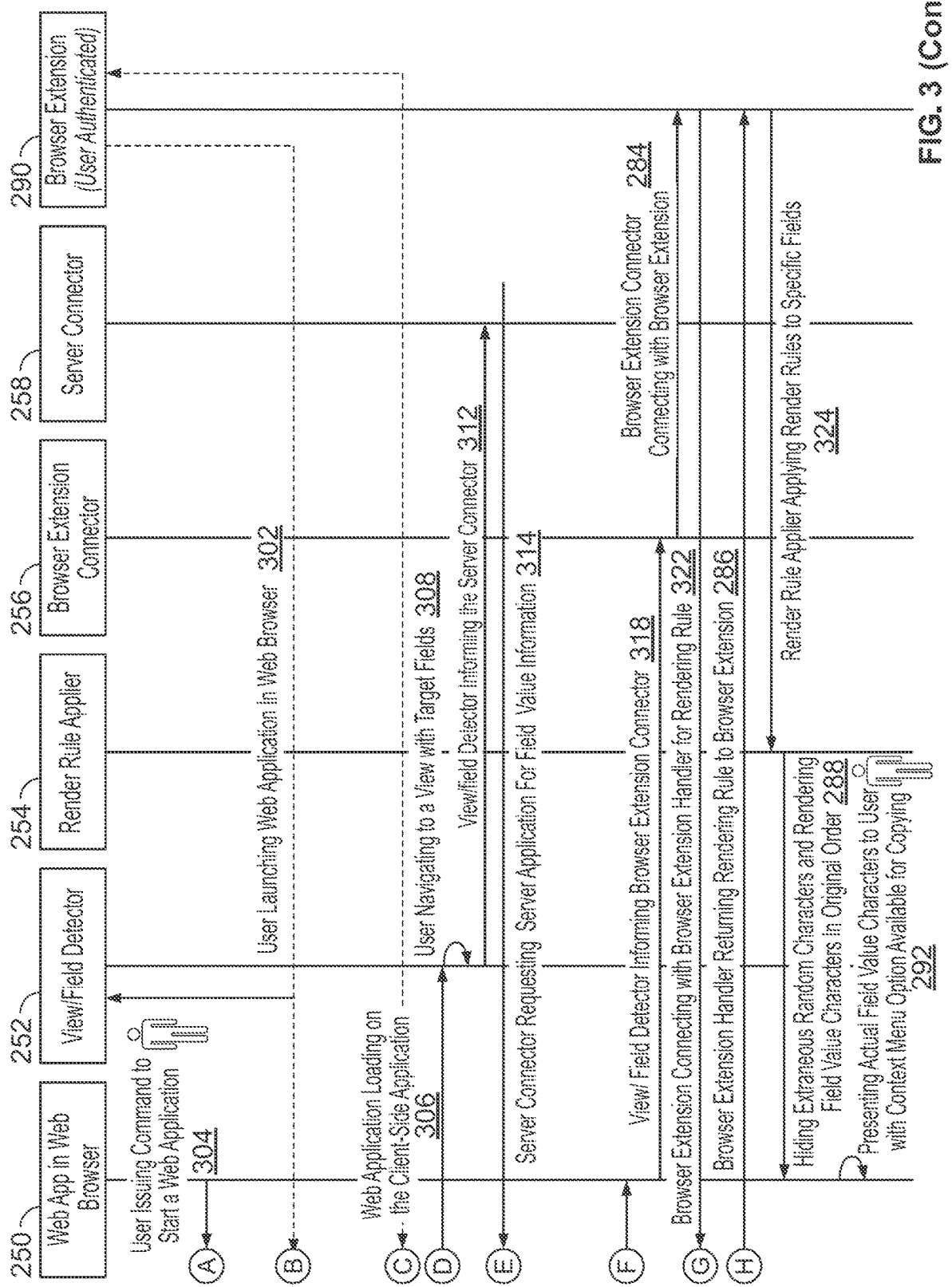

400 (Contd.)

- 422: Activating and authenticating web browser extension
- 424: Authenticating target user
- 426: Detecting elements received from the web server application
- 428: Requesting web server application for the protected rendering rule
- 432: Receiving rendering rules from the web server application
- 434: Rendering elements in accordance with the rendering rules
- 436: Generating protected text string by the web browser extension
- 438: Hiding random characters in the rendered view of the protected text string
- 442: Positioning the field value characters in the protected text string in the original order
- 444: Presenting field value information to authenticated viewer in the original order

FIG. 5

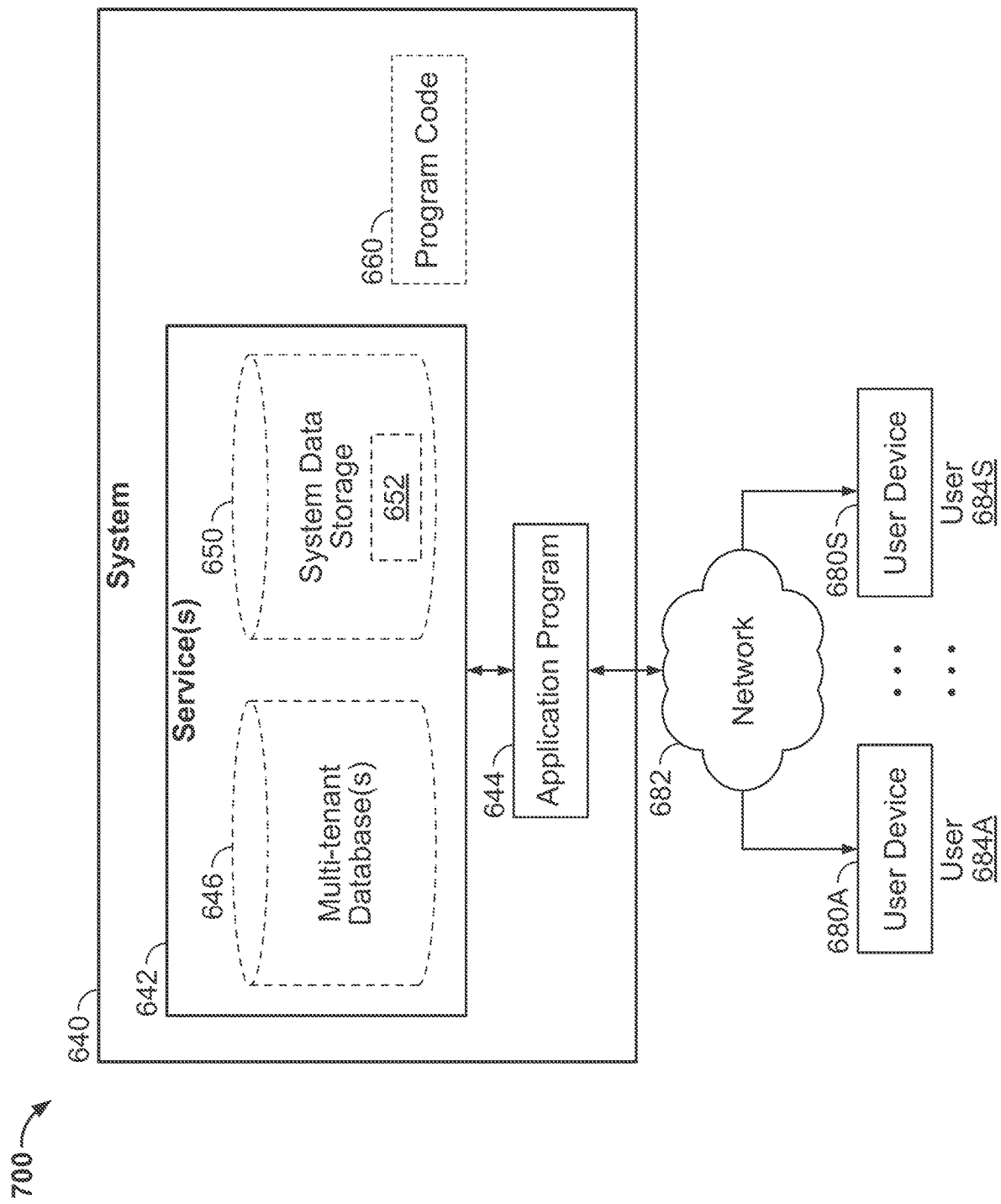

PROTECTIVELY DISPLAYING SPECIFIC FIELDS IN SPECIFIC VIEWS OF A SECURE INTERFACE

BACKGROUND

Traditionally, Web interfaces are protected by methods such as HTTPS, multi factor authentication etc. that relate to the full Web Application. These methods come with a maintenance overhead of encryption keys and encryption/decryption algorithms for protectively displaying sensitive contents of Web interfaces to an intended end user.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 5 is a flow diagram illustrating a method for providing additional security to a specific field in a specific view of a web interface, in accordance with an embodiment of this disclosure.

FIG. 7 is a block diagram of an exemplary deployment environment according to an example implementation.

DETAILED DESCRIPTION

Figure 1:
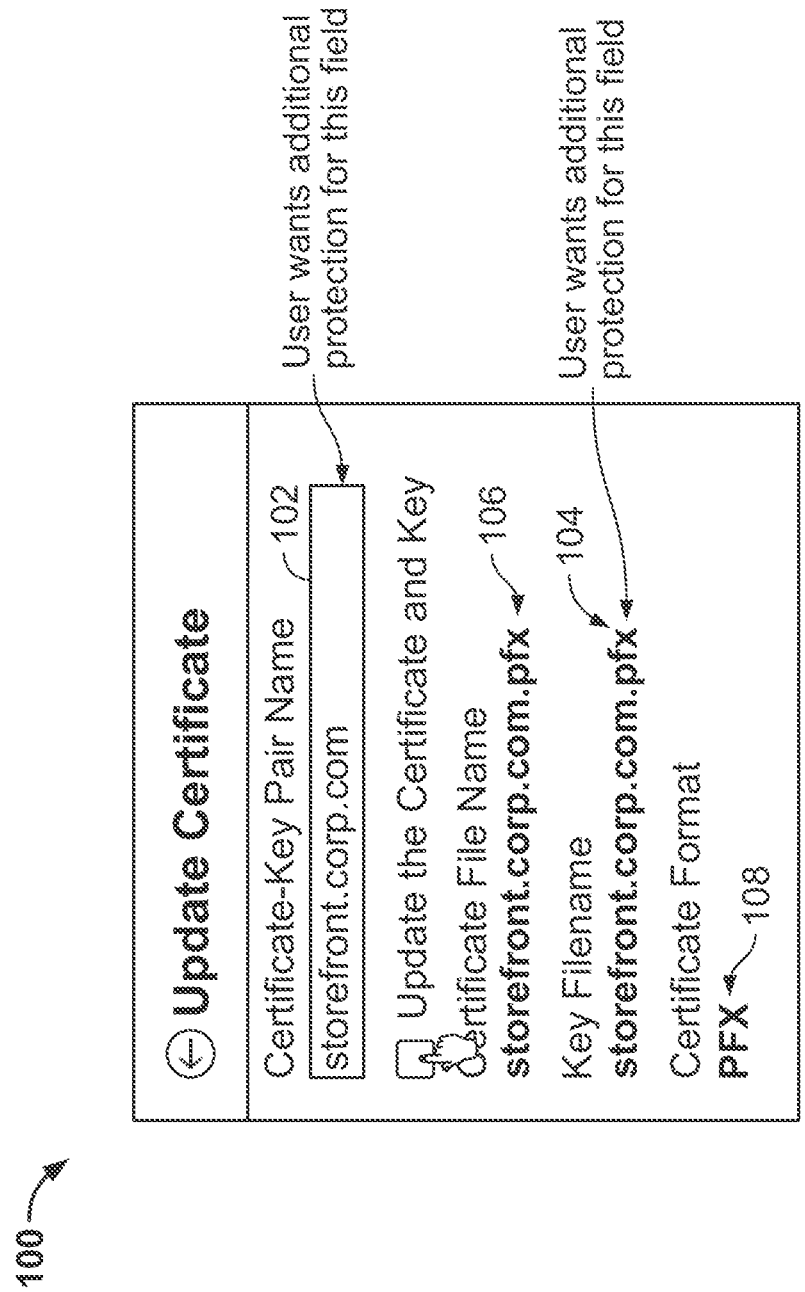
FIG. 1 is a block diagram illustrating an example standard view of a Web interface and several fields of the standard view of the Web interface.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Network management devices, cloud solutions, and the like are often monitored and configured via web application user interfaces. Each interface may have one or more standard "views," which include a presentation of one or more user fields and other information. It is common that views in these interfaces (also known as "web interfaces") may hold sensitive contents, which are rendered (or displayed) to an end user. In conventional systems, these web interfaces are often protected by the secure hypertext transfer (HTTPS) protocol. Such protection may be used for a full web interface and/or for various standard views in web interfaces.

Problems may arise when sensitive information is viewed in a protected environment and there is a chance that some parts of the web interface are accessed by multiple admins or multiple users, or when a user's system is exposed to multiple viewers, some of whom are not authorized to view it. Additional security, instead of or in addition to the standard protection available, may be desired or intended, under these circumstances, for specific fields in specific views of the web application interface. Illustrative specific fields in some critical views include an update certificate information, a certificate key pair details, detailed private key information, or other sensitive file names and/or contents. The existing solutions do not provide specific protection to specific fields in a view. Even if an application owner intends to add specific protection for a field in a view, existing legacy encryption/decryption algorithms for specific fields in specific views come with overhead of maintaining encryption keys, encryption/decryption algorithms, keys renewal, maintainability, processing overhead, and the like.

Various implementations of the disclosed subject matter may provide an improvement to user interface security, especially for web application, by protecting specific fields in specific views of the web interface, without requiring legacy encryption/decryption methods. Implementations disclosed herein may provide one or more components of an end-to-end solution for improved security, including a server application, a client application and/or a browser extension, which may provide additional protection for specific fields in specific views. Only an intended user with authenticated browser extension can view the sensitive data displayed in the specific field of the specific view. Embodiments disclosed herein also may include generic solutions for any rendered part of a web interface application and may not be limited only to specific fields and views.

In an aspect of the present disclosure, a computer-implemented method is disclosed. The method may include receiving a request from a client device for field value information in a view of a web client application that includes a web browser application; generating a real value of the field value information in response, with field value characters arranged in an original order; generating elements of the web application including random characters and the field value characters; and assigning unique identity numbers to the elements, positioned within the elements. The method also may include arranging the elements in a random order different than the original order of the field value characters to form a protected text string, providing the protected text string to the web client application for rendering, and providing a protected rendering rule to the web browser application. The protected rendering rule may cause the web client application to display the field value information.

The computer-implemented method may further include the web browser application activating and authenticating a web browser extension, authenticating a target user such as by using an authentication method, detecting the elements received from the web server application, and requesting the web server application for the protected rendering rule. The method also may include the extension receiving the rendering rules from the web server application, rendering elements in accordance with the rendering rules, and generating the protected text string. The method may further include hiding the random characters in the rendered view of the protected text string, positioning the field value characters in the protected text string in the original order, and presenting the field value characters in the field value information in the original order.

The computer-implemented method further may include providing a context menu for the field value information that allows copying of the real value of the field value information as needed by an end user.

The number of random characters may be equal to or more than the number of field value characters in the field value information. The computer-implemented method may not use legacy encryption methods or legacy decryption methods.

In an aspect of the disclosed subject matter, an apparatus is disclosed that includes a processor, a web server application digitally connected with the processor that includes server-side web components, a web client application digitally connected with the processor and including client-side web components, and a web browser application digitally connected with the processor and including a web browser extension. The apparatus also includes a non-transitory machine-readable storage medium that provides instructions that are configurable to cause the apparatus to perform any of the methods disclosed herein.

In an aspect of the disclosed subject matter, a non-transitory machine-readable storage medium is disclosed that includes instructions that, if executed by a processor, are configurable to cause said processor to perform operations and methods for securing a web application interface as disclosed herein.

FIG. 1 is a block diagram illustrating an example of a standard view of a Web interface that includes several fields. When a view is rendered and displayed to an end user, a HTML DOM (Document Object Model) structure is created, and the related field data are fetched from the server and written in the associated fields of the web application. The web application may be, for example, a Representational state transfer (REST) application, though embodiments disclosed herein are operable with any suitable user interface. Referring to FIG. 1, a such as view 100 and specific fields 102 and 104 may be exceptionally sensitive and need additional protection from unauthorized viewing, or additional protection may be desired for any reason by the developer of the application. Non-limiting examples of these kind of views include interview views to manage SSL certificate keys and secure socket layer (SSL) configurations, private encryption keys rendered in a settings view, wherein specific fields contain sensitive keys. Referring to FIG. 1 again, other fields 106 and 108 in view 100 may not be sensitive and do not need additional protection.

Figure 2A:
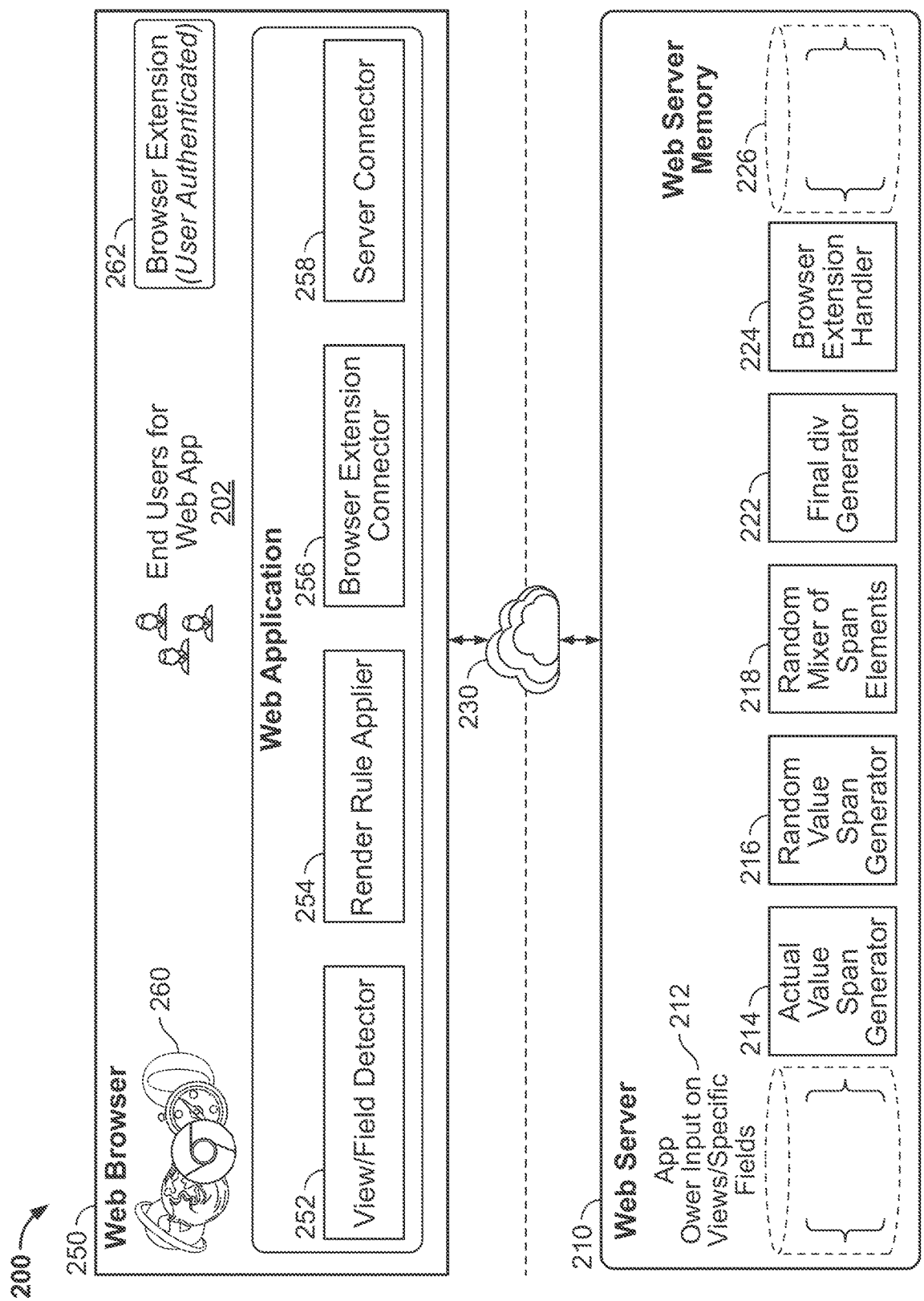
FIG. 2A is a block diagram illustrating a system for providing additional security to a specific field in a specific view of a web interface, in accordance with an embodiment of this disclosure.

FIG. 2A is a block diagram of a system 200 for providing additional security to specific views and specific fields of a web interface as disclosed herein. System 200 includes a web server application 210 digitally connected with a computer processor (not shown), a cloud or internet service 230, and a web client application 250.

The web server application 210 may include several server-side web components, such as an application owner input module 212, an actual value span generator 214, a random value span generator 216, a random mixer of span elements 218, a final div generator 222, a browser extension handler 224 and a web server memory 226. The web client application 250 may include several client-side web components, such as, a view/field detector 252, a render rule applier 254, a browser extension connector 256, and a server connector 258.

The system 200 may also include a web browser ("browser") 260 and a web browser extension ("browser extension") 262. Browser extensions are software modules typically used for customizing a web browser by providing a variety of extensions including user interface modifications, cookie management, ad blocking, custom scripting, styling of web pages and the like. There are several browser extensions commercially available for the network management interfaces of the current context, such as AWS for Salesforce platform, Azure for Microsoft platform, Google Cloud Platform, and the like. Referring back to FIG. 2A, the browser extension 262 is installed in the browser 260 and is typically authenticated with the web server application 210. As is commonly known in the art, there are there are many browser extensions, such as LastPass or Crypto Wallet typically used for viewing valid information and there are multiple ways to authenticate a similar browser extension for the web server application 210.

Although described here as being separate components for ease of illustration and understanding, it will be understood that various components may be combined and/or split into multiple components based on functionality, requirements of the host system, or other constraints and architectural decisions unrelated to the present disclosure without departing from the scope or content of the disclosure. For example, the span generators 214, 216, mixer 218, and/or div generator 222 may be provided by a single logical or functional component or separate aspects of a single component, and may be provided by any combination of functional code implemented on any combination of physical processors, server systems, cloud-based systems or other components.

Figure 2B:
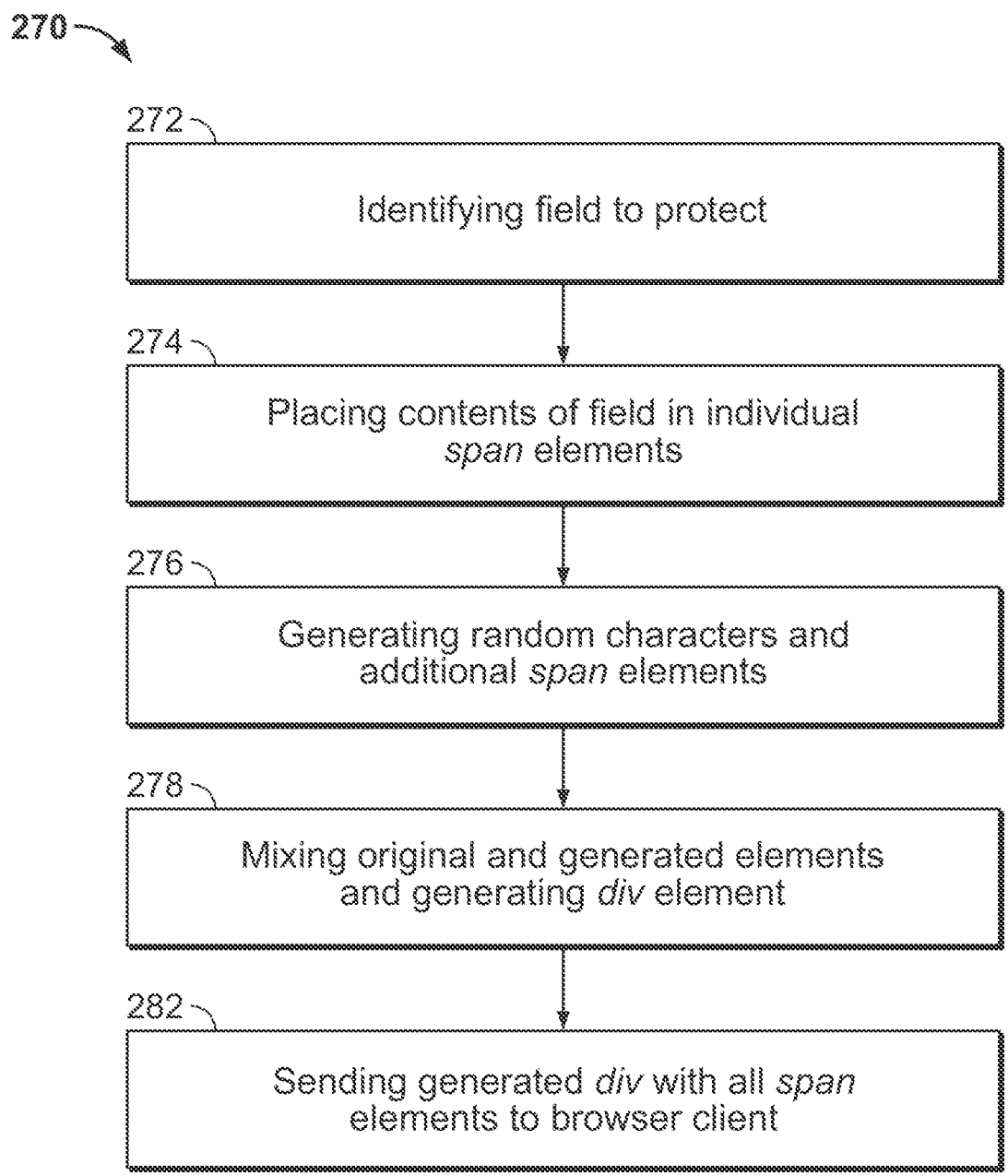
FIG. 2B shows an example logic flow of a system as described with respect to FIG. 2A.

FIG. 2B shows an example logic flow 270 of a system 200 as described with respect to FIG. 2A. In the description below, illustrative field value characters and illustrative randomly generated extraneous characters are provided as an example, but it will be understood that an equivalent process may be performed for any arbitrary text as needed.

At step 272, a specific field to be protected is identified which includes, for example the data "ABCDE". At step 274, the client application requests this field value from the server that is providing the web application interface and the server places each character from the original text in a web display element (for instance, a <span> element) with unique identifiers. The order of these span IDs may be stored in a web server memory. For example, for the original plaintext "ABCDE", the server may generate the following <span> elements where each span ID is a unique identifier:

<span id="unique id$_1$">A</span>
<span id="unique id$_2$">B</span>
<span id="unique id$_3$">C</span>
<span id="unique id$_4$">D</span>
<span id="unique id$_5$">E</span>

Although <span> elements may be most convenient in typical web browser application arrangements and document models, other logical and/or structural HTML elements may be used as long as a unique identifier can be associated with each.

At step 276, random characters are generated, inserted in additional <span> elements, and mixed with above set. For example, if random characters 1, 3, 7, *, $ are generated, the resulting set of <span> elements may be the following:

```
<span id="unique id₁">A</span>
<span id="unique id₂">B</span>
<span id="unique id₃">C</span>
<span id="unique id₄">D</span>
<span id="unique id₅">E</span>
<span id="unique id₆">1</span>
<span id="unique id₇">3</span>
<span id="unique id₈">7</span>
<span id="unique id₉">*</span>
<span id="unique id₁₀">$</span>
```

The server preservers/remembers these span ids for a specific client session. The <span> elements may then be randomly mixed together and put under a common <div> element or other equivalent construct, at step 278:

```
<div>
  <span id="unique id₅">E</span>
  <span id="unique id₈">7</span>
  <span id="unique id₄">D</span>
  <span id="unique id₂">B</span>
  <span id="unique id₇">3</span>
  <span id="unique id₁">A</span>
  <span id="unique id₆">1</span>
  <span id="unique id₉">*</span>
  <span id="unique id₁₀">$</span>
  <span id="unique id₃">C</span>
</div>
```

At step 282, the <div> element formed above is sent to the client application. The conventional web application renders the field data accordingly, as a protected string "E7DB3A1*$C", from which a malicious or unintended user is not able to derive the original plaintext "ABCDE". The original plaintext of the sensitive field data is thus protected.

Figure 2C:
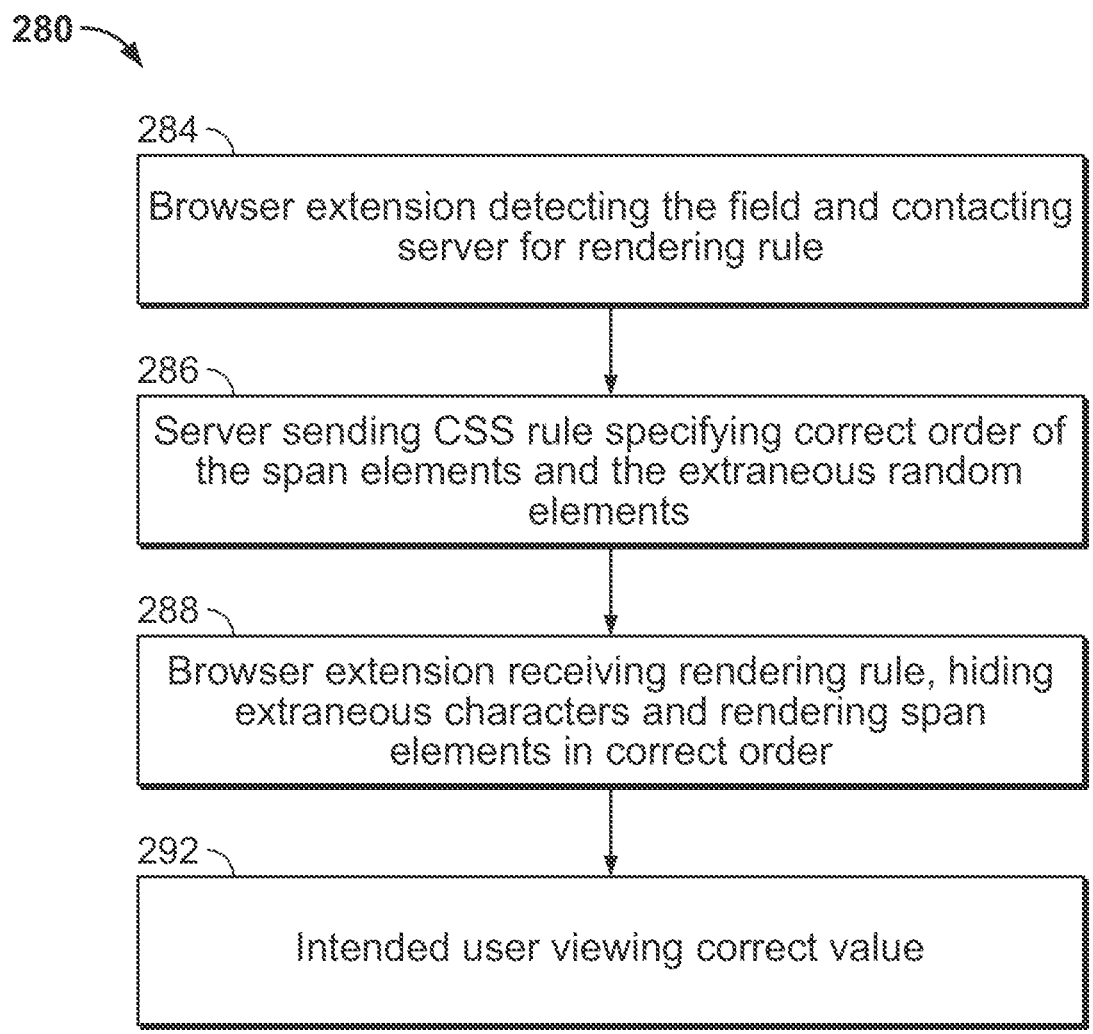
FIG. 2C shows an example logic flow of a system as described with respect to FIG. 2A.

FIG. 2C shows a corresponding process 280 for displaying the correct field data to an authenticated user. At 284, the <div> element returned from the server application 210 is rendered at the client application 250 specific field and specific view. The protected text string "E7DB3A1*$C" is displayed in the view/field detector 252 and the view/field detector 252 informs the browser extension 262. The browser extension 262, which is already active and authenticated, automatically detects that the protected text string value "E7DB3A1*$C" is loaded in the specific field of the specific view. The browser extension 262 reaches out and connects with the server application 210 for a rendering rule, which technically is a CSS styling rule, as in step 284.

The server application 210 retrieves the rendering rule from the web server memory 226 where the original field value information and the rendering rule had been cached earlier for this specific client session. The server application 210 returns the rendering rule to the browser extension, as in step 284.

The browser extension 262 applies a reverser-rendering rule so that the extraneous random characters 7, 3, 1, *, and $ are hidden and the remaining field value characters E, D, B, A, and C, tracked by their respective unique ids, are rearranged in the original order, A, B, C, D, and E, as in step 288. At this point, the web application renders real data and the user can see the original field value characters "ABCDE" in the specific field, as in step 292.

In an aspect, there is a context menu added to the specific field display for copying contents from the correctly ordered <span> elements. The user gets an option to copy the field value information of the specific field in the specific view, with a right click of the mouse or the like.

Referring again to FIG. 2A and the server applications 210, an application owner 212 typically provides input on specific views and specific fields that need to be protected, in terms of the path or ID of the field, as in step 272 of FIG. 2B. The application owner provides the input about the specific views and specific fields. Each view typically has its own ID in a parent <div> element that is rendered in html and the application owner can provide that information in an appropriate format.

When a user requests a field value of a specific field, such as 102 and 104 described with respect to FIG. 1, the actual value span generator 214 generates the actual field value information, for example "ABCDE", character by character, as in step 274 of FIG. 2B. Subsequently, the random value span generator 216 generates several random value characters, for example, 1, 3, 7, *, $, as in step 276 of FIG. 2B. The random mixer of span elements 218 randomly mixes the actual field value characters A, B, C, D, and E and the random value characters 1, 3, 7, *, and $, creating a protected text string "E7DB3A1*$C", which is the set of <span> elements described above. The final div generator 222 then packs the protected text string "E7DB3A1*$C" into a web display element (for instance, a <div> element), as in step 278 of FIG. 2B and sends the web display element back to the client application 250, as in step 282 of FIG. 2B.

The server application 210 includes a web server memory 226. As is commonly known in the art, a typical web server memory, associated with a web server, stores and preserves important session related information. Referring to system 200, a storage file is maintained in the web server memory 226 that stores the random mixed characters details as well as the order in which the characters are mixed in the protected text string. Further, the specific fields and specific view information that is provided by the application owner 212 are also stored in the web server memory 226.

Referring to the client application 250 web components of FIG. 2A, the view/field detector 252 detects the view and the field which is currently being displayed to the user. There are several ways to detect a field in a view in a field. One exemplary way is to scan the document object model (DOM) of the view being displayed for changes and to review the view IDs that are displayed in the DOM. The view/field detector 252 connects with the render rule applier 254 which, in turn, connects with the browser extension connector 256. The browser extension connector 256 detects that the intended field is loaded in the specific field and connects with the browser extension 262 for further processing, as in step 284 of FIG. 2C.

Thus, the browser extension 262 connects with the server application 210, specifically with the browser extension handler 224, which is an endpoint. At this point, all session specific information is stored and available at the web server memory 226. The browser extension handler 224 accesses the session details from the web server memory 226 and pulls the rendering rule that explains the random values that are inserted and the order in which they are placed into the protected text string. The server application 210 sends the rendering rule and the extraneous random elements to the browser extension 262, as in step 286 of FIG. 2C.

Referring back to the client application 250, the browser extension 262 connects with the browser extension connector 256 and provides the rendering rule and the protected text string. The browser extension connector 256 invokes the render rule applier 254 to apply the rendering rule and reverse the rendering performed by the server application 210. Thus, the render rule applier 254 applies the rendering rules and reverse-renders the protected text string. The extraneous random values are hidden and the original field value characters are arranged in their original order, as in step 288 of FIG. 2C. Finally, the original value (e.g. "ABCDE") of the specific field information is displayed to the authenticated user, as in step 292 of FIG. 2C.

This method of protecting specific fields in a specific view does not employ any of the legacy encryption/decryption algorithms and relies on simple Cascading Style Sheets (CSS) rules. If there are several characters in a string, the server application uses a CSS to place the field value characters in proper order, each character position having a unique ID and then intersperse the field value characters with several other randomly generated extraneous characters. As a method of reverse rendering, an authenticated client application uses CSS rules again to hide the extraneous characters and put the original field value characters in original order. The use of the span elements, as a facilitating mechanism, helps arranging and displaying the field valued characters in one single line, and may avoid breaking over multiple consecutive lines. The use of unique IDs, as another facilitating mechanism, helps in reverse rendering because the unique identifiers assigns the relative positions of the field value characters and codifies the original order of the original field value characters.

An example CSS rule, used on specific span elements, to hide random extraneous characters is given below:
display: none;
An example CSS rule to keep span values inside a div element, in original order, is given below:
div Element
<div id="flex">
<span id="id1">Z</span>
<span id="id2">C</span>
<span id="id3">A</span>
</div>
CSS Rule:

```
#flex {
display: flex;
}
#flex > #id1 { order: 2; }
#flex > #id2 { order: 3; }
#flex > #id3 { order: 1; }
```

Figure 3:
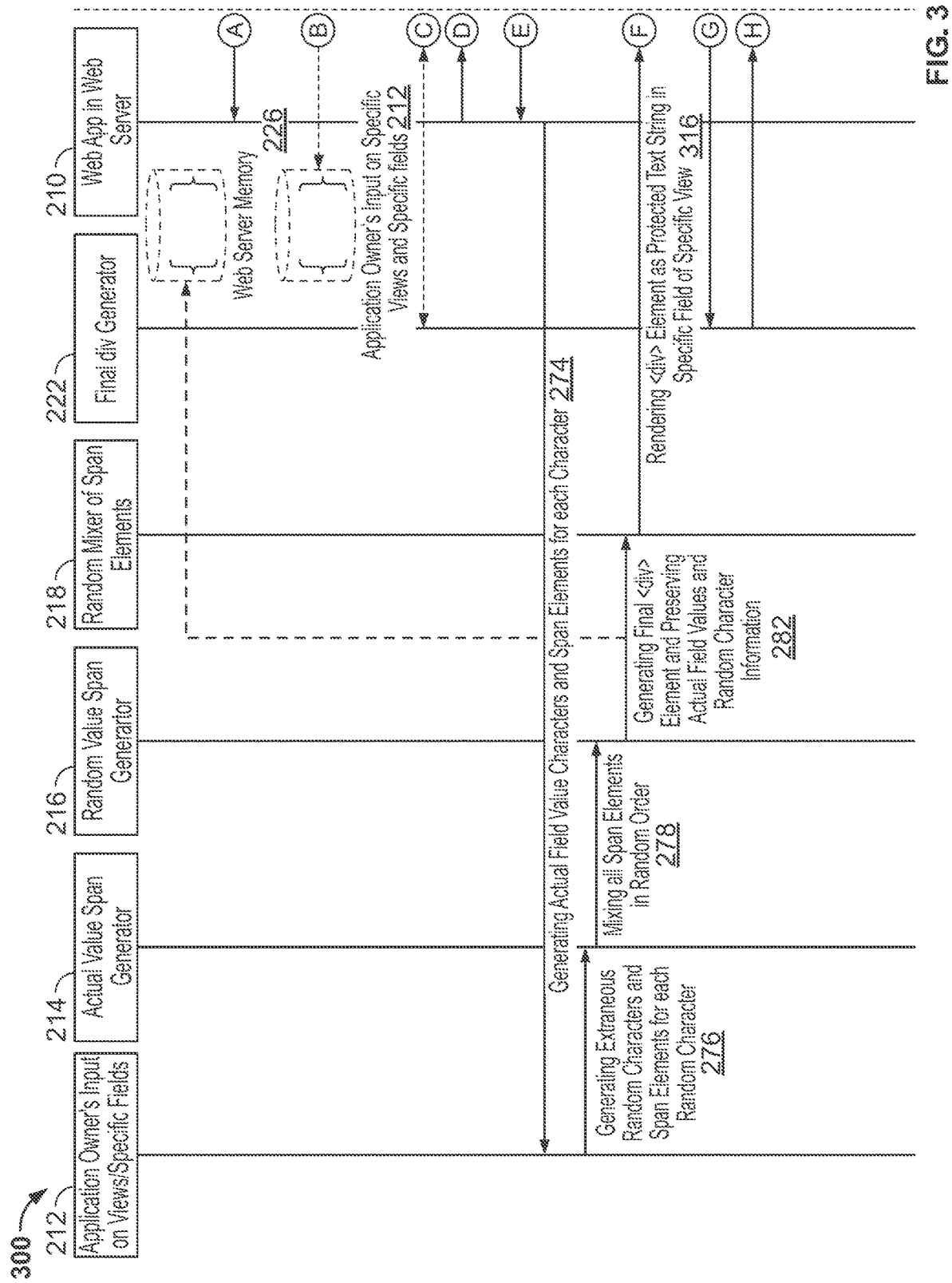
FIG. 3 is a block diagram illustrating a process flow of the system of FIG. 2A.

FIG. 3 is a block diagram that illustrates the process flow of the system of FIG. 2. In operation, the system of FIG. 2 includes a non-transitory machine-readable storage medium that provides instructions that, if executed by the processor, are configurable to cause the apparatus to perform several operations. The operations include requesting, by the web client application 250, the web server application 210 for a field value information 102 and 104 (FIG. 1) in a view 100 (FIG. 1) of the web client application. The field value information 102, 104 and/or the view 100 may be defined in the system or selected by the system prior to execution of the operations, or they may be determined in any suitable fashion depending on the need for a particular application 210. The web server application 210 responds to the request and generates a protected text string and a protected rendering rule. The protected text string is representational of the field value information. The web browser application 250, later, renders the protected text string in accordance with the rendering rule and displays the field value information 102 and 104 (FIG. 1) to an authenticated target user 202.

Referring to FIG. 3 again and traversing from top to bottom and left to right, following the arrowing lines, the application owner 212 gives input on what views and specific fields are to be protected, as in step 272 of FIG. 2B. A user launches a web application in web browser, as in process step 302 and issues commands to start the web application, as in step 304. Accordingly, the web application is loaded on the client-side application, as in step 306. The user navigates to a view with target fields, as in step 308. As mentioned above, the view/field detector 252 may continuously scan the content of the active DOM and, when the specific view is identified, the view/field detector 252 informs the server connector 258, as in step 312. The server connector 258 requests for the field value information to be rendered in the specific field of the specific view by the server application 210, as in step 314.

Continuing to refer to FIG. 3, the server application 210 validates the details of the specific field and the specific view with the data provided by the application owner 212, now stored in the web server memory 226 specific to the client session. The server application 210, subsequently, informs the actual value span generator 214 and generates the field value information. For example, the field value information can be "ABCDE", as described earlier, in step 274 of FIG. 2B. Continuing with the example, the characters A, B, C, D, and E are generated one by one and inserted into appropriate web display elements, such as <span> elements. These span elements are given unique identifiers that are randomly generated. The web server memory 226, at this point, preserves/remembers the field value characters, their unique identifiers and the order in which the field value characters are arranged.

The server application 210 communicates with the random value span generator 216. The random value span generator 216 generates several random characters, for example, 1, 3, 7, *, $, as in step 276 of FIG. 2B. The random characters are added in the <span> elements created earlier for the field value characters. It may be preferred to use at least the same number of random characters as in the original value, though any number may be used. The random mixer of span elements 218 randomly mixes the actual field value characters and the random value characters, as in step 278 of FIG. 2B, creating a protected text string "E7DB3A1*$C", which is the set of <span> elements described above. The final div generator 222 places the total collection of span elements in a random order inside a <div> element, as in step 278 of FIG. 2B and sends back the protected text string to the client application 250 for rendering, as in step 282 of FIG. 2B. It is ensured that the field value characters within the randomized span elements are not in their original order. The <div> element returned from the server application 210 is rendered at the client application 250, in the specific field and specific view, as in step 316. The browser extension 262, which is already active and authenticated, automatically detects that the protected text string value is loaded in the specific field of the specific view.

At this point, if a browser extension is not installed, an error message may be provided and, for example, the user may be prompted to obtain, install, and/or allow execution of the appropriate browser extension. In a similar manner, if an installed browser extension is not authenticated, or compromised or tampered with, the browser extension may not detect anything and the user may be notified of the error and/or provided an option to allow operation of the extension.

In case of properly installed and properly authenticated client application browser, the protected text string is displayed in the view/field detector 252 and the view/field detector 252 informs the browser extension connector 256, as in step 318. The browser extension connector 256, in turn connects with the browser extension 262, as in step 284 of FIG. 2C. The browser extension 262 reaches out and connects with the browser extension handler 224 for a rendering rule, as in step 322. The rendering rule may be, for example, a CSS styling rule. The browser extension handler 224 retrieves the rendering rule from the web server memory 226 where the original field value information and the rendering rule had been cached earlier for this specific user session. The browser extension handler 224 returns the rendering rule to the browser extension 262, as in step 286 of FIG. 2C. The browser extension 262 invokes the render rule applier 254 for reverse rendering the protected text string. The render rule applier 254 applies the rendering rule, as in step 324. Accordingly, all extraneous characters are hidden and the remaining field value characters, tracked by their unique identifiers, are rearranged in the original order, as in step 288 of FIG. 2C. At this point, the user can see the original field value characters in the specific field, as in step 292 of FIG. 2C.

In an aspect, there is a context menu added to the specific field display for copying contents from the correctly ordered <span> elements. The user gets an option to copy the field value information of the specific field in the specific view, with a right click.

Figure 4:
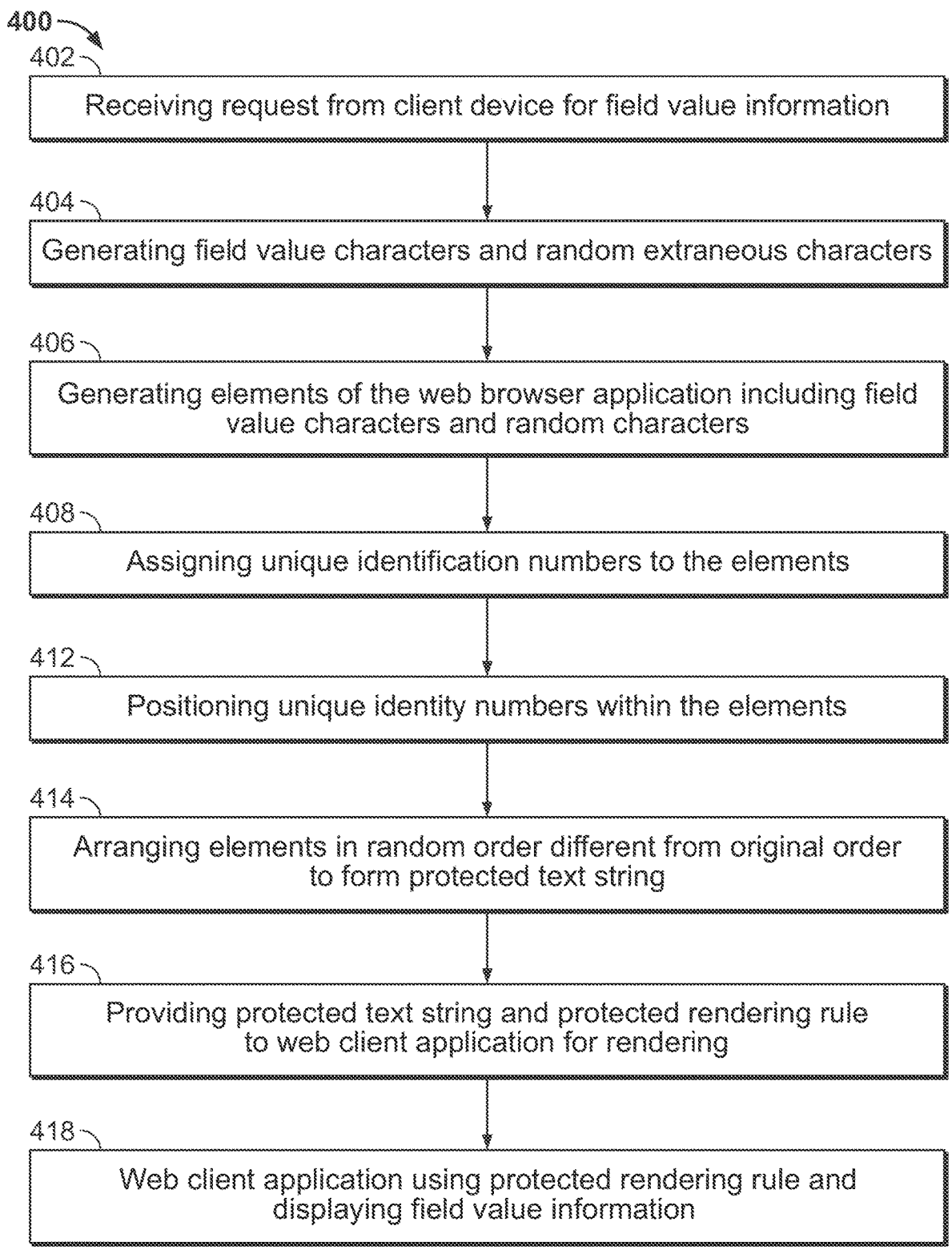
FIG. 4 is a flow diagram illustrating a method for providing additional security to a specific field in a specific view of a web interface, in accordance with an embodiment of this disclosure.

FIG. 4 is a flow diagram illustrating a computer-implemented method 400 for providing additional security to a specific field in a specific view of a web interface as disclosed herein. The method may be performed, for example, by a system as shown in FIG. 2 operating in conjunction with a user's web browser. The method 400 includes, as in step 402, receiving a request from a client device for a field value information in a view of a web client application. The web client application may include, for example, a web browser application as previously disclosed. At 404, responsive to the requesting, the system may generate the field value information character by character and also generating several extraneous random value characters. The real value of the field value information may include several field value characters arranged in an original order as previously disclosed. At 406, web display elements of the web browser application may be generated. The web display elements may include the field value characters and the random value characters as previously disclosed.

The method 400 further includes, as in step 408, assigning unique identifiers to the elements. At 412, the unique identifiers may be positioned within web display elements as previously disclosed. At 414, the web display elements may be arranged in a random order different than the original order of the field value characters to form a protected text string and at 416 the protected text string and a protected rendering rule are provided to the web client application for reverse rendering the protected text string. The protected rendering rule causes the web client application to display the field value information at 418.

The method 400 further includes providing a context menu for the field value information that allows copying of the real value of the field value information. The number of random characters may be at least equal to the number of field value characters in the field value information. Notably, this computer-implemented method does not require the use of a legacy encryption method or a legacy decryption method, though the use of such is not prohibited.

FIG. 5 continues the method of FIG. 4 to show how the protected text is received and processed at the end user's device, for example through a web browser and/or extension as previously disclosed. At 422, a web browser extension may be activated and authenticated. Similarly, a target user of the web browser may be authenticated at 424, using an authentication method. The method also includes, as in step 426, detecting the elements received from the web server application and, as in step 428, requesting the web server application for the protected rendering rule for rendering the elements as previously disclosed. At 432, the rendering rules are received from the web server application, for example, after being sent by the system at 416 in FIG. 4. At 434, the elements are rendered in accordance with the rendering rules and, at 436, the protected text string may be generated as previously disclosed. At 438, the random characters may be hidden in the rendered view of the protected text string and, at 442, the field value characters are positioned in the protected text string in the original order. Finally, at 444, the field value characters are presented in the field value information in the original order to the target user.

One or more parts of the above implementations may include software. Software is a general term whose meaning can range from part of the code and/or metadata of a single computer program to the entirety of multiple programs. A computer program (also referred to as a program) includes code and optionally data. Code (sometimes referred to as computer program code or program code) includes software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (typically, though not necessarily an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6:
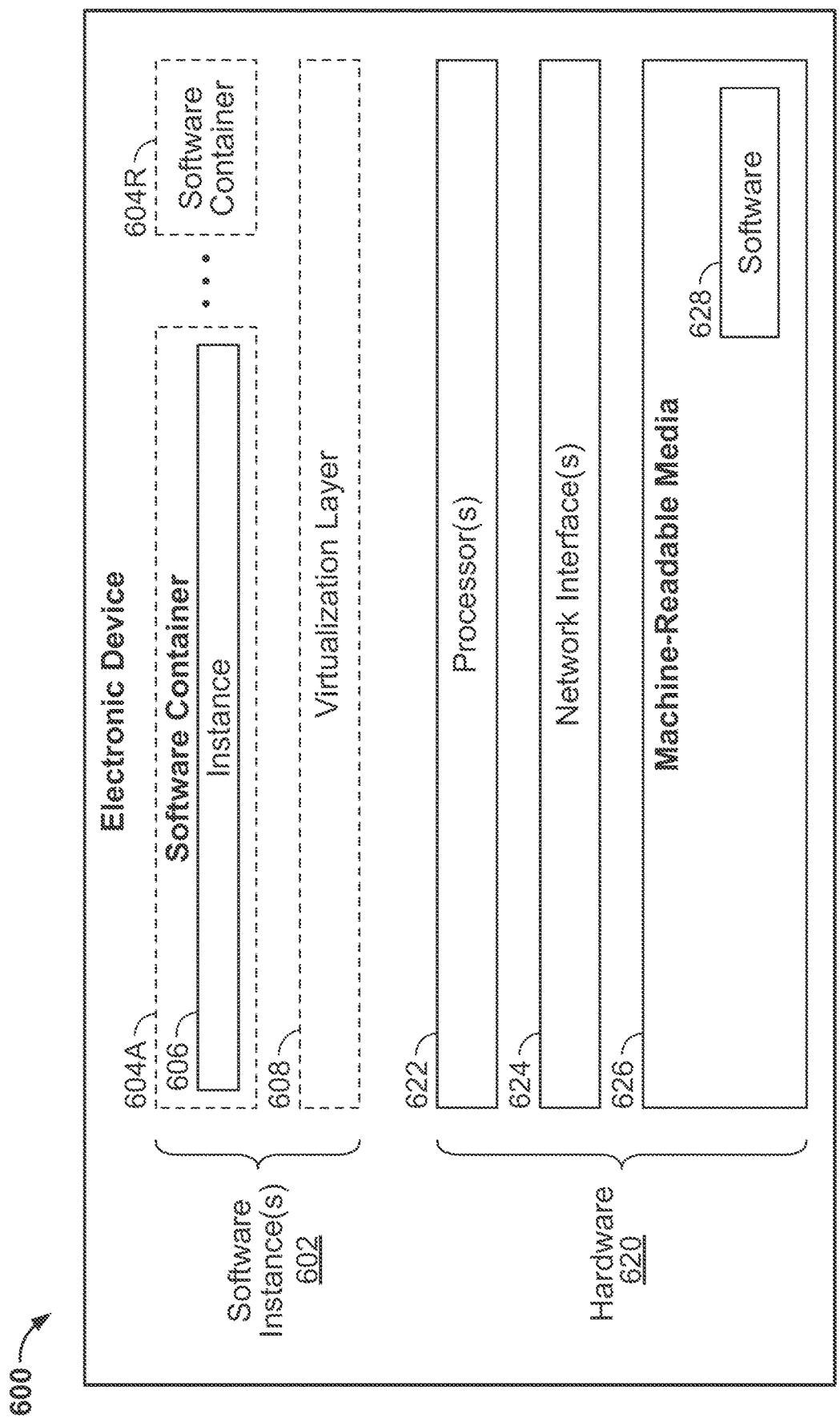
FIG. 6 is a block diagram illustrating an exemplary electronic device according to an example implementation.

FIG. 6 is a block diagram illustrating an electronic device 600 according to some example implementations. FIG. 6 includes hardware 620 including a set of one or more processor(s) 622, a set of one or more network interfaces 624 (wireless and/or wired), and machine-readable media 626 having stored therein software 628 (which includes instructions executable by the set of one or more processor (s) 622). The machine-readable media 626 may include non-transitory and/or transitory machine-readable media. Each of the previously described clients and server components may be implemented in one or more electronic devices 600. In one implementation: 1) each of the clients is implemented in a separate one of the electronic devices 600 (e.g., in end user devices where the software 628 represents the software to implement clients to interface directly and/or indirectly with server components (e.g., software 628 represents a web browser, a native client, a portal, a command-line interface, and/or an application programming interface (API) based upon protocols such as Simple Object Access Protocol (SOAP), Representational State Transfer (REST), etc.)); 2) server components is implemented in a separate set of one or more of the electronic devices 600 (e.g., a set of one or more server devices where the software 628 represents the software to implement the framework for providing additional security to protected fields in protected views); and 3) in operation, the electronic devices implementing the clients and server components would be communicatively coupled (e.g., by a network) and would establish between them (or through one or more other layers and/or other services) connections for submitting requests to server components and returning responses to the clients. Other configurations of electronic devices may be used in other implementations (e.g., an implementation in which the client and server components are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor (s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

FIG. 7 is a block diagram of a deployment environment according to some example implementations. A system 640 includes hardware (e.g., a set of one or more server devices) and software to provide service(s) 642, including server components. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services.

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method comprising:
   receiving a request from a client device for a field value information in a view of a web client application, the web client application comprising a web browser application;
   responsive to the request from the client device:
   generating a real value of the field value information, the real value of the field value information comprising a plurality of field value characters arranged in an original order;
   generating a plurality of elements of the web browser application, the plurality of elements comprising a plurality of random characters and the plurality of field value characters;
   assigning unique identity numbers to the plurality of elements, the unique identity numbers positioned within the plurality of elements;
   arranging the plurality of elements in a random order different than the original order of the field value characters to form a protected text string;
   providing the protected text string to the web client application for rendering;
   providing a protected rendering rule to the web browser application, wherein the protected rendering rule causes the web client application to display the field value information;
   activating and authenticating, by the web browser application, a web browser extension;
   authenticating a target user, by the web browser application, using an authentication method;
   detecting, by the web browser extension, the plurality of elements received from the web server application;
   requesting, by the web browser extension, the protected rendering rule for rendering the plurality of elements;
   receiving, by the web browser extension, the rendering rules from the web server application;
   rendering, by the web browser extension, the plurality of elements in accordance with the rendering rules;
   generating, by the web browser extension, the protected text string;
   hiding, by the web browser extension, the plurality of random characters in the rendered view of the protected text string;
   positioning, by the web browser extension, the field value characters in the protected text string in the original order; and
   presenting, to the target user, the field value characters in the field value information in the original order.

2. The computer-implemented method of claim 1 further comprising providing a context menu for the field value information that allows copying of the real value of the field value information.

3. The computer-implemented method of claim 1, wherein the number of random characters is at least equal to the number of field value characters in the field value information.

4. The computer-implemented method of claim 1, wherein the computer-implemented method does not use a legacy encryption method or a legacy decryption method.

5. An apparatus comprising:
   a processor;
   a web server application digitally connected with the processor, the web server application comprising server-side web components;
   a web client application digitally connected with the processor, the web client application comprising client-side web components;
   a web browser application digitally connected with the processor, the web browser application comprising a web browser extension;
   a non-transitory machine-readable storage medium that provides instructions that, if executed by the processor, are configurable to cause the apparatus to perform operations comprising:
   receiving a request from a client device for a field value information in a view of a web client application, the web client application comprising a web browser application;
   responsive to the request from the client device:
   generating a real value of the field value information, the real value of the field value information comprising a plurality of field value characters arranged in an original order;
   generating a plurality of elements of the web browser application, the plurality of elements comprising a plurality of random characters and the plurality of field value characters;
   assigning unique identity numbers to the plurality of elements, the unique identity numbers positioned within the plurality of elements;
   arranging the plurality of elements in a random order different than the original order of the field value characters to form a protected text string;
   providing the protected text string to the web client application for rendering;
   providing a protected rendering rule to the web browser application, wherein the protected rendering rule causes the web client application to display the field value information;
   activating and authenticating, by the web browser application, a web browser extension;
   authenticating a target user, by the web browser application, using an authentication method;

detecting, by the web browser extension, the plurality of elements received from the web server application;

requesting, by the web browser extension, the protected rendering rule for rendering the plurality of elements;

receiving, by the web browser extension, the rendering rules from the web server application;

rendering, by the web browser extension, the plurality of elements in accordance with the rendering rules;

generating, by the web browser extension, the protected text string;

hiding, by the web browser extension, the plurality of random characters in the rendered view of the protected text string;

positioning, by the web browser extension, the field value characters in the protected text string in the original order; and presenting, to the target user, the field value characters in the field value information in the original order.

6. A non-transitory machine-readable storage medium that provides instructions that, if executed by a processor, are configurable to cause said processor to perform operations comprising:

receiving a request from a client device for a field value information in a view of a web client application, the web client application comprising a web browser application;

responsive to the request from the client device:

generating a real value of the field value information, the real value of the field value information comprising a plurality of field value characters arranged in an original order;

generating a plurality of elements of the web browser application, the plurality of elements comprising a plurality of random characters and the plurality of field value characters;

assigning unique identity numbers to the plurality of elements, the unique identity numbers positioned within the plurality of elements;

arranging the plurality of elements in a random order different than the original order of the field value characters to form a protected text string;

providing the protected text string to the web client application for rendering;

providing a protected rendering rule to the web browser application, wherein the protected rendering rule causes the web client application to display the field value information;

activating and authenticating, by the web browser application, a web browser extension;

authenticating a target user, by the web browser application, using an authentication method;

detecting, by the web browser extension, the plurality of elements received from the web server application;

requesting, by the web browser extension, the protected rendering rule for rendering the plurality of elements;

receiving, by the web browser extension, the rendering rules from the web server application;

rendering, by the web browser extension, the plurality of elements in accordance with the rendering rules;

generating, by the web browser extension, the protected text string;

hiding, by the web browser extension, the plurality of random characters in the rendered view of the protected text string;

positioning, by the web browser extension, the field value characters in the protected text string in the original order; and presenting, to the target user, the field value characters in the field value information in the original order.

7. A computer-implemented method comprising:

requesting a web server application for a field value information in a view;

the requesting causing the web server application to:

generate a real value of the field value information, the real value of the field value information comprising a plurality of field value characters arranged in an original order;

generate a plurality of elements, the plurality of elements comprising a plurality of random characters and the plurality of field value characters;

assign unique identity numbers to the plurality of elements, the unique identity numbers positioned within the plurality of elements; and arrange the plurality of elements in a random order different than the original order of the field value characters to form a protected text string;

receiving the protected text string from the web server application;

receiving a protected rendering rule from the web server application for rendering the protected text string;

displaying the field value information using the protected rendering rule;

activating and authenticating a web browser extension;

authenticating a target user using an authentication method;

detecting, by the web browser extension, the plurality of elements received from the web server application;

requesting, by the web browser extension, the protected rendering rule for rendering the plurality of elements;

receiving, by the web browser extension, the rendering rules from the web server application;

rendering, by the web browser extension, the plurality of elements in accordance with the rendering rules;

generating, by the web browser extension, the protected text string;

hiding, by the web browser extension, the plurality of random characters in the rendered view of the protected text string;

positioning, by the web browser extension, the field value characters in the protected text string in the original order; and presenting, to the target user, the field value characters in the field value information in the original order.

8. The computer-implemented method of claim 7 further comprising providing a context menu for the field value information that allows copying of the real value of the field value information.

9. The computer-implemented method of claim 7, wherein the number of random characters is at least equal to the number of field value characters in the field value information.

10. The computer-implemented method of claim 7, wherein the computer-implemented method does not use a legacy encryption method or a legacy decryption method.

11. An apparatus comprising:
a processor;
a web server application digitally connected with the processor, the web server application comprising server-side web components;
a web client application digitally connected with the processor, the web client application comprising client-side web components;
a web browser application digitally connected with the processor, the web browser application comprising a web browser extension;
a non-transitory machine-readable storage medium that provides instructions that, if executed by the processor, are configurable to cause the apparatus to perform operations comprising:
  requesting a web server application for a field value information in a view;
  the requesting causing the web server application to:
    generate a real value of the field value information, the real value of the field value information comprising a plurality of field value characters arranged in an original order;
    generate a plurality of elements, the plurality of elements comprising a plurality of random characters and the plurality of field value characters;
    assign unique identity numbers to the plurality of elements, the unique identity numbers positioned within the plurality of elements; and
    arrange the plurality of elements in a random order different than the original order of the field value characters to form a protected text string;
  receiving the protected text string from the web server application;
  receiving a protected rendering rule from the web server application for rendering the protected text string;
  displaying the field value information using the protected rendering rule;
  activating and authenticating a web browser extension;
  authenticating a target user using an authentication method;
  detecting, by the web browser extension, the plurality of elements received from the web server application;
  requesting, by the web browser extension, the protected rendering rule for rendering the plurality of elements;
  receiving, by the web browser extension, the rendering rules from the web server application;
  rendering, by the web browser extension, the plurality of elements in accordance with the rendering rules;
  generating, by the web browser extension, the protected text string;
  hiding, by the web browser extension, the plurality of random characters in the rendered view of the protected text string;
  positioning, by the web browser extension, the field value characters in the protected text string in the original order; and
  presenting, to the target user, the field value characters in the field value information in the original order.

12. A non-transitory machine-readable storage medium that provides instructions that, if executed by a processor, are configurable to cause said processor to perform operations comprising:
requesting a web server application for a field value information in a view;
the requesting causing the web server application to:
  generate a real value of the field value information, the real value of the field value information comprising a plurality of field value characters arranged in an original order;
  generate a plurality of elements, the plurality of elements comprising a plurality of random characters and the plurality of field value characters;
  assign unique identity numbers to the plurality of elements, the unique identity numbers positioned within the plurality of elements; and
  arrange the plurality of elements in a random order different than the original order of the field value characters to form a protected text string;
receiving the protected text string from the web server application;
receiving a protected rendering rule from the web server application for rendering the protected text string;
displaying the field value information using the protected rendering rule;
activating and authenticating a web browser extension;
authenticating a target user using an authentication method;
detecting, by the web browser extension, the plurality of elements received from the web server application;
requesting, by the web browser extension, the protected rendering rule for rendering the plurality of elements;
receiving, by the web browser extension, the rendering rules from the web server application;
rendering, by the web browser extension, the plurality of elements in accordance with the rendering rules;
generating, by the web browser extension, the protected text string;
hiding, by the web browser extension, the plurality of random characters in the rendered view of the protected text string;
positioning, by the web browser extension, the field value characters in the protected text string in the original order; and
presenting, to the target user, the field value characters in the field value information in the original order.

13. A computer-implemented method comprising:
requesting, by a web client application, a web server application for a field value information in a view of the web client application, the web client application comprising a web browser application;
responsive to the requesting, providing by the web server application to the web client application, a protected text string and a protected rendering rule, the protected text string representational of the field value information;
rendering, by the web browser application, the protected text string in accordance with the protected rendering rule and displaying the field value information to a target user;
generating a real value of the field value information, by the web server application, the real value of the field value information comprising a plurality of field value characters arranged in an original order;
generating a plurality of elements of the web browser application, by the web server application, the plurality of elements comprising a plurality of random characters and the plurality of field value characters;
assigning unique identity numbers to the plurality of elements, by the web server application, the unique identity numbers positioned within the plurality of elements;

arranging the plurality of elements in a random order different than the original order of the field value characters, by the web server application, to form a protected text string;
providing the protected text string, by the web server application, to the web client application for rendering;
providing a protected rendering rule, by the web server application, to the web browser application, wherein the protected rendering rule causes the web client application to display the field value information;
activating and authenticating, by the web browser application, a web browser extension;
authenticating a target user, by the web browser application, using an authentication method;
detecting, by the web browser extension, the plurality of elements received from the web server application;
requesting, by the web browser extension, the protected rendering rule for rendering the plurality of elements;
receiving, by the web browser extension, the rendering rules from the web server application;
rendering, by the web browser extension, the plurality of elements in accordance with the rendering rules;
generating, by the web browser extension, the protected text string;
hiding, by the web browser extension, the plurality of random characters in the rendered view of the protected text string;
positioning, by the web browser extension, the field value characters in the protected text string in the original order; and
presenting, to the target user, the field value characters in the field value information in the original order.

14. The computer-implemented method of claim 13, wherein the web client application requesting the web server application comprises:
receiving an input to the field value information and the view from a target user; and
the web client application requesting the web server application for the field value information based on the input.

15. The computer-implemented method of claim 13 further comprising providing a context menu for the field value information that allows copying of the real value of the field value information.

16. The computer-implemented method of claim 13, wherein the number of random characters is at least equal to the number of field value characters in the field value information.

17. The computer-implemented method of claim 13, wherein the computer-implemented method does not use a legacy encryption method or a legacy decryption method.

18. An apparatus comprising:
a processor;
a web server application digitally connected with the processor, the web server application comprising server-side web components;
a web client application digitally connected with the processor, the web client application comprising client-side web components;
a web browser application digitally connected with the processor, the web browser application comprising a web browser extension;
a non-transitory machine-readable storage medium that provides instructions that, if executed by the processor, are configurable to cause the apparatus to perform operations comprising:

requesting, by a web client application, a web server application for a field value information in a view of the web client application, the web client application comprising a web browser application;
responsive to the requesting, providing by the web server application to the web client application, a protected text string and a protected rendering rule, the protected text string representational of the field value information;
rendering, by the web browser application, the protected text string in accordance with the protected rendering rule and displaying the field value information to a target user;
generating a real value of the field value information, by the web server application, the real value of the field value information comprising a plurality of field value characters arranged in an original order;
generating a plurality of elements of the web browser application, by the web server application, the plurality of elements comprising a plurality of random characters and the plurality of field value characters;
assigning unique identity numbers to the plurality of elements, by the web server application, the unique identity numbers positioned within the plurality of elements;
arranging the plurality of elements in a random order different than the original order of the field value characters, by the web server application, to form a protected text string;
providing the protected text string, by the web server application, to the web client application for rendering;
providing a protected rendering rule, by the web server application, to the web browser application, wherein the protected rendering rule causes the web client application to display the field value information;
activating and authenticating, by the web browser application, a web browser extension;
authenticating a target user, by the web browser application, using an authentication method;
detecting, by the web browser extension, the plurality of elements received from the web server application;
requesting, by the web browser extension, the protected rendering rule for rendering the plurality of elements;
receiving, by the web browser extension, the rendering rules from the web server application;
rendering, by the web browser extension, the plurality of elements in accordance with the rendering rules;
generating, by the web browser extension, the protected text string;
hiding, by the web browser extension, the plurality of random characters in the rendered view of the protected text string;
positioning, by the web browser extension, the field value characters in the protected text string in the original order; and
presenting, to the target user, the field value characters in the field value information in the original order.

19. A non-transitory machine-readable storage medium that provides instructions that, if executed by a processor, are configurable to cause said processor to perform operations comprising:
requesting, by a web client application, a web server application for a field value information in a view of the web client application, the web client application comprising a web browser application;

responsive to the requesting, providing by the web server application to the web client application, a protected text string and a protected rendering rule, the protected text string representational of the field value information;

rendering, by the web browser application, the protected text string in accordance with the protected rendering rule and displaying the field value information to a target user;

generating a real value of the field value information, by the web server application, the real value of the field value information comprising a plurality of field value characters arranged in an original order;

generating a plurality of elements of the web browser application, by the web server application, the plurality of elements comprising a plurality of random characters and the plurality of field value characters;

assigning unique identity numbers to the plurality of elements, by the web server application, the unique identity numbers positioned within the plurality of elements;

arranging the plurality of elements in a random order different than the original order of the field value characters, by the web server application, to form a protected text string;

providing the protected text string, by the web server application, to the web client application for rendering; and providing a protected rendering rule, by the web server application, to the web browser application, wherein the protected rendering rule causes the web client application to display the field value information;

activating and authenticating, by the web browser application, a web browser extension;

authenticating a target user, by the web browser application, using an authentication method;

detecting, by the web browser extension, the plurality of elements received from the web server application;

requesting, by the web browser extension, the protected rendering rule for rendering the plurality of elements;

receiving, by the web browser extension, the rendering rules from the web server application;

rendering, by the web browser extension, the plurality of elements in accordance with the rendering rules;

generating, by the web browser extension, the protected text string;

hiding, by the web browser extension, the plurality of random characters in the rendered view of the protected text string;

positioning, by the web browser extension, the field value characters in the protected text string in the original order; and presenting, to the target user, the field value characters in the field value information in the original order.

\* \* \* \* \*